United States Patent [19]
Brockett

[11] Patent Number: 5,287,784
[45] Date of Patent: Feb. 22, 1994

[54] BREAD SLICING AND STORAGE DEVICE FOR CYLINDRICAL SHAPED LOAVES

[76] Inventor: David W. Brockett, 1855 W. 10th, Eugene, Oreg. 97402

[21] Appl. No.: 893,054

[22] Filed: Jun. 3, 1992

[51] Int. Cl.⁵ .............................................. B26D 1/54
[52] U.S. Cl. ........................................ 83/762; 83/746; 99/537
[58] Field of Search .................. 99/467, 537; 206/444, 206/445, 446; 83/467.1, 746, 762, 932

[56] References Cited

U.S. PATENT DOCUMENTS

| | | | |
|---|---|---|---|
| 194,417 | 8/1877 | Davis | 83/762 |
| 775,181 | 11/1904 | Kent | 99/537 |
| 1,072,450 | 9/1913 | Hamblin | 83/762 |
| 1,703,154 | 2/1929 | Lanzkron | 83/762 |
| 1,764,235 | 6/1930 | Wilmking | 83/762 |
| 2,108,992 | 2/1938 | Obenshain | 83/762 |
| 2,352,125 | 6/1944 | Sager | 83/762 |
| 2,398,192 | 4/1946 | Scheminger, Jr. | 83/762 |
| 2,429,756 | 10/1947 | Hartmann | 83/762 |
| 2,592,657 | 4/1952 | Cierley | 83/932 |
| 2,916,068 | 12/1959 | Zerneke | 83/762 |
| 3,561,511 | 2/1971 | Kummer | 99/537 |
| 4,131,043 | 12/1978 | Colman | 83/762 |
| 4,890,525 | 1/1990 | Bilbao | 83/762 |
| 4,964,323 | 10/1990 | Fortney | 83/467.1 |

FOREIGN PATENT DOCUMENTS 1468248  3/1977  United Kingdom ................. 83/762

Primary Examiner—Harvey C. Hornsby
Assistant Examiner—Randall E. Chin

[57] ABSTRACT

A bread slicing device designed specifically for use with cylindrical shaped loaves produced by home automatic bread baking machines. Consists of two parts: a clear cover with built in knife holder and a bread slicing holder. The bread slicing holder is rigid, monolithic in construction, featuring two opposing parallel slicing guide side walls which extend vertically from the base of the unit along two lateral outside edges. The lower two-thirds of the side walls interior surfaces are concave forming with the concave bottom a tapered sharply textured cylindrical cavity. Bread is inserted into slicing holder by way of a wedged shaped entry chute. The chute momentarily compresses the bread as it is inserted into the top of the bread slicing holder. Bread loaf then expands, firmly securing it into the cylindrical cavity. The slicing guide side walls are divided by a series of evenly spaced parallel vertical slots. These slots guide the cutting implement permitting accurate and consistent slices to be produced.

1 Claim, 3 Drawing Sheets

5,287,784

BREAD SLICING AND STORAGE DEVICE FOR CYLINDRICAL SHAPED LOAVES

BACKGROUND OF THE INVENTION

1. Field of the invention

This invention relates to a bread slicing and storage unit to be used for slicing cylindrical shaped loaves of bread, such as those produced by certain automated home bread bakingmachines. The device also doubles as a bread storage unit and knife holder.

2. Prior art

There are numerous patented devices designed to efficiently slice traditionally made, home baked bread. However, the advent and growing popularity of household automated breadmaking machines, many of which produce generally cylindrical shaped loaves rather than conventional rectangular ones, have created a need for a bread slicer specifically designed for use with these machines. Although some devices designed to cut rectangular loaves of bread could theoretically be employed to cut cylindrical loaves, the tendency of these curved loaf shapes to slide and rotate during slicing makes the use of these devices impractical. In addition many of these devices feature adjustment mechanisms allowing them to accommodate different sizes of bread. Since automated home bread bakers produce identical loaves this degree of complexity is unnecessary. It is therefore the object of this invention to present a device that will allow straight even slices to be cut simply and efficiently from a cylindrical loaf of bread, and also allow storage of same bread and a cutting utensil within the unit.

SUMMARY OF THE INVENTION

The invention concerns a device for slicing cylindrical loaves of bread and storing same and knife within unit. The device consists of two parts a bread slicing holder and a cover/knife holder. The bread slicing holder features a sharply textured tapered cylindrical gripping cavity to firmly hold bread loaves. The holder also includes two fixed curved slicing guide side walls with a series of knife guide slots within them. The cover, which includes a knife holder, fits closely over the top of the holder, enclosing its contents for storage.

DETAILED DESCRIPTION OF THE PREFERRED EMBODIMENT

Figure 1:
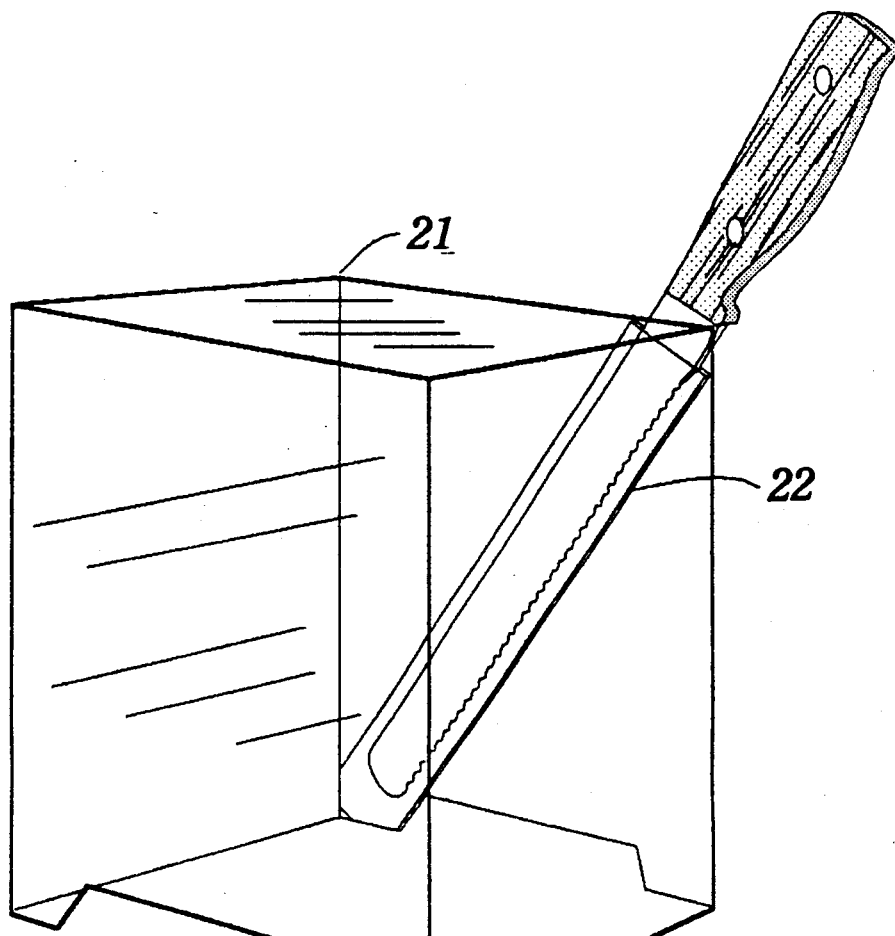
FIG. 1 is a perspective view of the front of cover showing stored knife.

Referring now to the drawings and in particular to FIG. 1 there is shown a perspective view of the bread slicing holder cover. The holder cover 21, is rigid, of one piece construction, open at the bottom and conforming to, but slightly larger than the outside surface of the holder, permitting it to fit closely over the top, completely enclosing the holder and its contents. A sheath, 22 is integrated within the cover, for holding and encasing the blade of the cutting implement.

Figure 2:
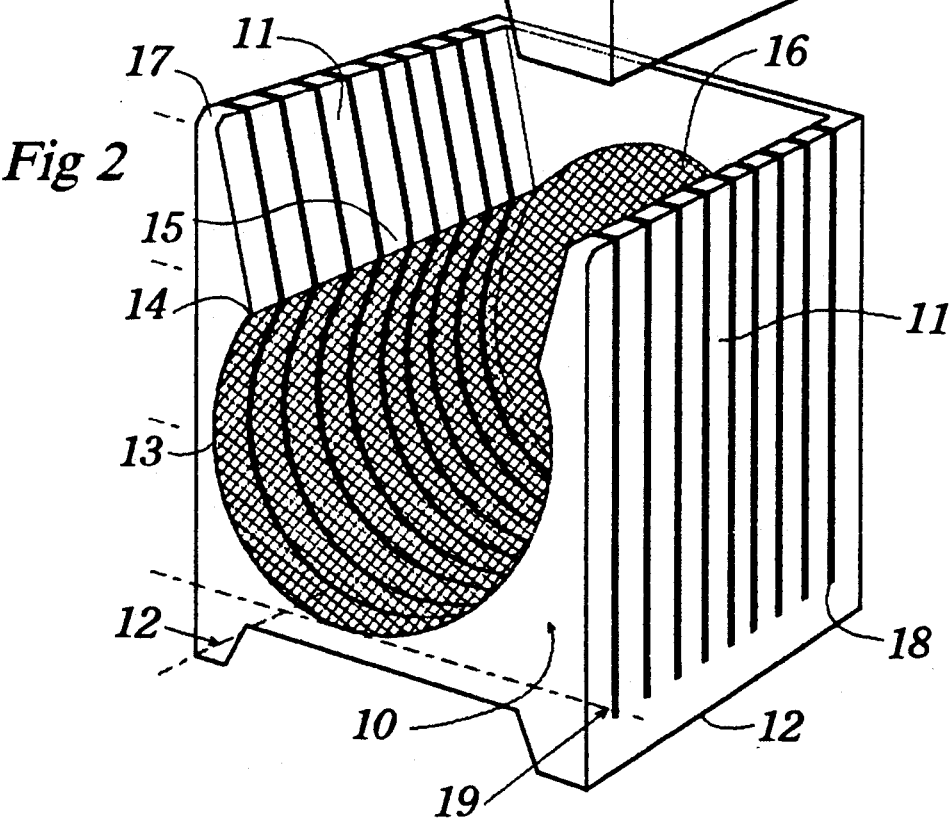
FIG. 2 is a perspective view of bread slicing holder without bread or knife.
Figure 3:
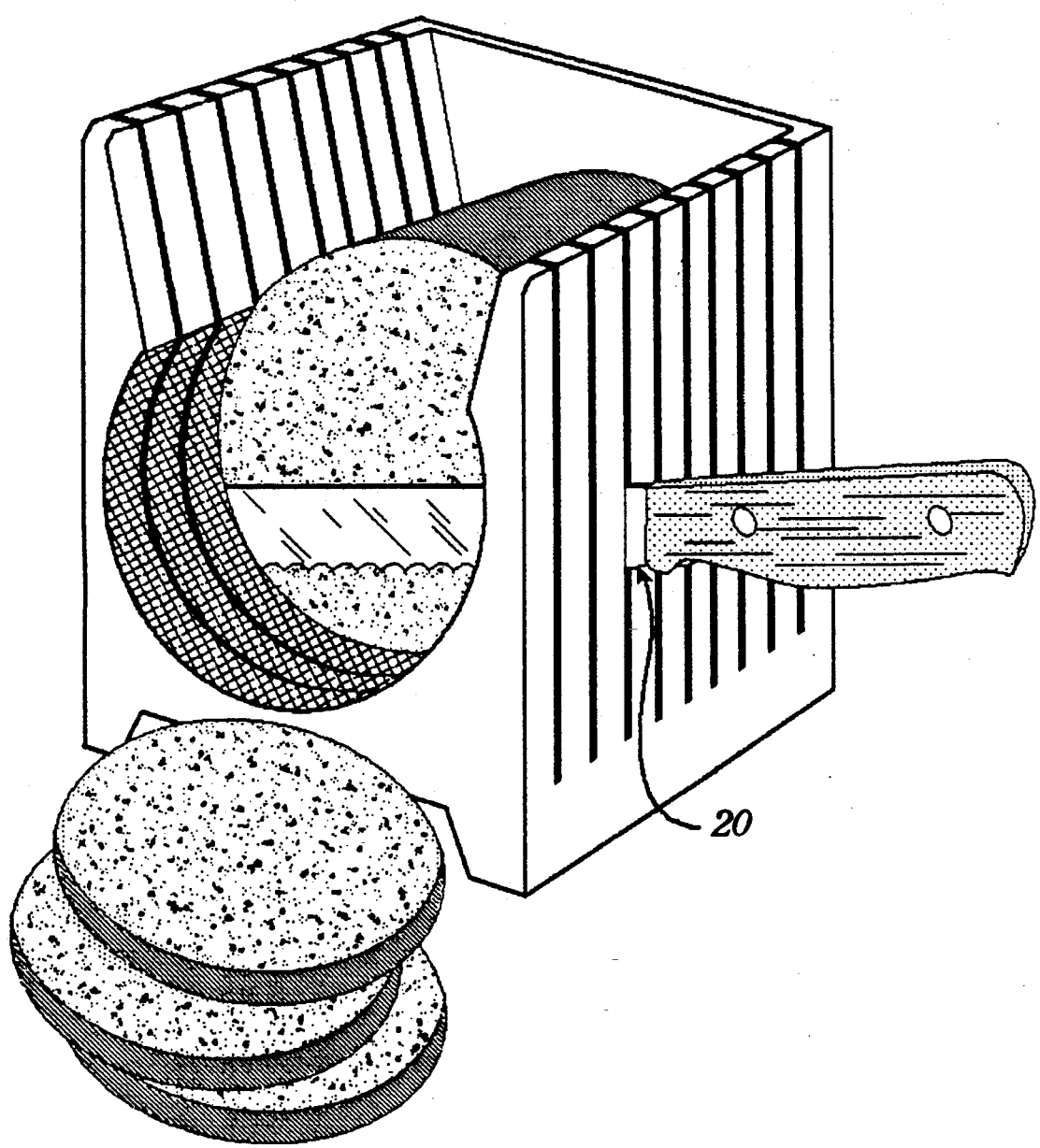
FIG. 3 is a perspective view of bread slicing holder in use showing bread and knife.
Figure 4:
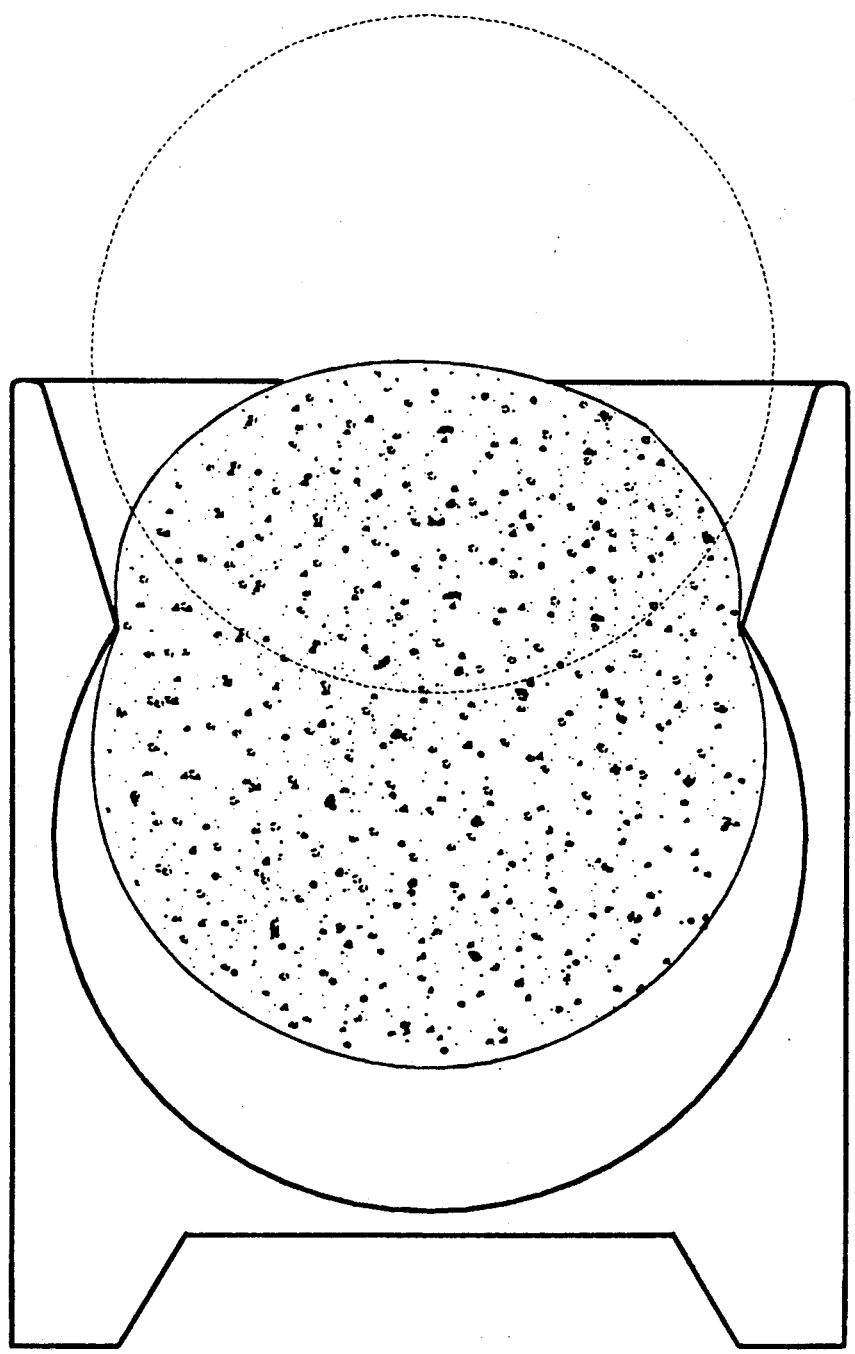
FIG. 4 is a perspective view of the front of the bread slicing holder showing bread loaf compressing during insertion.

Referring now to the drawings and in particular to FIG. 2, there is shown a perspective view of the bread slicing holder. The bread slicing holder, referred to with a numeral 10 is rigid and monolithic in construction featuring two opposing parallel slicing guide side walls, 11 which extend vertically from the base of the unit along two lateral outside edges 12. The lower two thirds of the side wall's interior surfaces are concave, forming with the concave bottom a cylindrical cavity, 13 which is open at the top along its full length, and closed at one end. This opening width is approximately 120 degrees of arc 14. As shown in FIG. 3 this cylindrical cavity matches closely with the shape of the bread loaf, but is slightly smaller, embracing itsecurely during cutting.

The upper one-third of these side walls form the opening to the cylindrical cavity. This opening, which is a wedged shaped chute, is opened at the top and runs lengthwise with the cavity 15. As shown in FIG. 2 all surfaces of the cylindrical cavity including the flat closed end are covered with a sharp, even texture 16. This texture grips the loaf and prevents the bread from sliding or rotating during cutting. As seen in FIG. 2 from the top of this textured cavity the remaining smooth upper one third of the wall surfaces continue upward and are tapered outward, narrowing towards the top 17. The guide walls are divided by a series of evenly spaced, parallel vertical slots, 18 which descend from the top of the walls to a level just past the bottom of the curved cavity 19. Each slot becomes shallow as it traverses the bottom of the curved cavity and then joins with another slot directly across from it on the opposite guide wall. As shown in FIG. 3 these paired slots are slightly wider than the blade of the cutting implement 20 to allow the blade to pass smoothly between them guiding the blade as it slices vertically through the bread loaf.

What is claimed is:

1. A device for storing and slicing a cylindrically shaped bread loaf comprising:

a rigid holder including a base;

two opposing parallel guide side walls extending upwardly from said base, each having an upper and lower portion;

a flat end wall perpendicular to and joining said guide side walls and extending upwardly from said base;

said lower portion of said guide side walls and said flat end wall forming a cylindrical open-topped cavity opened at one end and closed at the other end by said flat end wall for receiving said loaf therein, said upper portion of said guide side walls forming a lengthwise entry chute which defines said open-topped cavity, said entry chute being wedge shaped and including sides which taper and narrow downwardly and inwardly and merge with said cylindrical open-topped cavity permitting said loaf to momentarily compress as it is inserted through said chute and permitting said loaf to then expand within said cavity firmly securing said loaf therein;

said cylindrical cavity containing therein a sharply textured gripping surface for gripping and preventing any sliding or rotating movement of said loaf held therein;

said guide side walls and said cavity including a series of evenly spaced, parallel vertical slots which extend from the top of said walls to a level slightly below the cylindrical cavity permitting a cutting knife to pass smoothly through a slot as it vertically slices said loaf;

and a holder cover having an open bottom permitting it to fit closely over the top of and completely enclosing said holder, said holder cover having integrally attached thereto a sheath for encasing said cutting knife.

* * * * *